(12) United States Patent
Hedin

(10) Patent No.: US 6,676,131 B1
(45) Date of Patent: Jan. 13, 2004

(54) SEALING RING FOR A CENTRIFUGAL SEPARATOR

(75) Inventor: Sven Hedin, Huddinge (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/936,258

(22) PCT Filed: Mar. 8, 2000

(86) PCT No.: PCT/SE00/00454
§ 371 (c)(1),
(2), (4) Date: Jan. 30, 2002

(87) PCT Pub. No.: WO00/53326
PCT Pub. Date: Sep. 14, 2000

(30) Foreign Application Priority Data

Mar. 9, 1999 (SE) .............................................. 9900862

(51) Int. Cl.7 .............................. F16J 15/34; F16J 15/16
(52) U.S. Cl. ........................ 277/370; 277/358; 277/587
(58) Field of Search ................................ 277/358, 587, 277/370

(56) References Cited

U.S. PATENT DOCUMENTS

| | | | | |
|---|---|---|---|---|
| 2,828,069 A | | 3/1958 | Steinacker et al. | |
| 3,558,097 A | * | 1/1971 | DeFrees | 251/88 |
| 3,575,431 A | * | 4/1971 | Bryant | 277/641 |
| 3,910,555 A | * | 10/1975 | Bertrem et al. | 251/306 |
| 4,534,570 A | * | 8/1985 | Munde | 277/399 |
| 4,828,274 A | * | 5/1989 | Stannard | 277/641 |
| 5,482,297 A | * | 1/1996 | Burns et al. | 277/644 |
| 5,577,737 A | * | 11/1996 | Lacy | 277/308 |
| 5,743,707 A | * | 4/1998 | Battig et al. | 415/113 |
| 6,328,316 B1 | * | 12/2001 | Fukuhara et al. | 277/644 |

* cited by examiner

Primary Examiner—Anthony Knight
Assistant Examiner—Michael J. Kyle
(74) Attorney, Agent, or Firm—McCormick, Paulding & Huber LLP

(57) ABSTRACT

Sealing ring (1) for a centrifugal separator with an axially open annular groove (7) for the sealing ring in a first rotor part (2) and a relative to the first rotor part (2) axially movable second rotor part (3), against which the sealing ring (1) sealingly abuts. Both the sealing ring (1) and the groove (7) have a first annular portion (8 and 9, respectively) turned towards the second rotor part (3) and a second annular portion (14 and 11, respectively) turned away from the second rotor part (3). The second portion (11) of the groove has an outer annular recess (12) and an inner annular recess (16) whereas the second annular portion (14) of the sealing ring (1) has at least one projection (15), which is arranged to at least partly fill up the outer recess of the groove (7). The sealing ring (1) and the groove (7) are so shaped and adapted to one another that the sealing ring is kept in the groove locked by its shape and the tightening force is transferred from the sealing ring (1) to the first rotor part (2) by pressing the sealing ring (1) against the bottom (13) of the groove and so that the sealing ring (1) upon elastical deformation of the same and/or the first rotor part (2) can be brought into position in and be taken out of the groove.

8 Claims, 2 Drawing Sheets

SEALING RING FOR A CENTRIFUGAL SEPARATOR

FIELD OF THE PRESENT INVENTION

The present invention concerns a sealing ring intended upon mounting to be inserted in an axial open annular groove in a first rotor part of a centrifugal separator, which has a second rotor part movable relative to the first rotor part, the second rotor part having a abutment surface intended to be brought in and out of sealing abutment against a sealing surface of a sealing ring mounted in the groove, the sealing ring being pressed axially in a direction into the groove.

BACKGROUND OF THE INVENTION

In U.S. Pat. No. 4,534,570 a sealing ring of this kind is disclosed, which is exposed to very high loads. To be able during operation to prevent liquid from leaking out of the centrifugal separator passing the sealing ring, the second rotor part has to be pressed with its abutment surface against the sealing surface with a force, which gives a sealing pressure, which with enough margin exceeds the liquid pressure, against which the sealing ring must seal.

The liquid pressure next to sealing rings of this kind in centrifugal separators is often very high as a result of the high number of revolutions per minute at which rotors of centrifugal separators rotate. Therefore, the force needed for tightening the rotor components against the seal often is very high.

It is then very important to ensure that the sealing ring is firmly fixed in its groove after every axial movement of the second rotor part in and out of sealing abutment against the sealing surface of the sealing ring.

For this purpose sealing rings of this kind have conical radial delimiting surfaces and are pressed into annular grooves in the first rotor part, which also has conical delimiting surfaces.

However, this means that a very great portion of the tightening force is taken up by the conical surfaces, which causes high concentrations of stresses in adjacent portions of the first rotor part.

The object of the present invention is to provide a sealing ring which can be kept in its groove in the first rotor part without causing high stresses in adjacent portions of the first rotor part.

SUMMARY OF THE INVENTION

The present invention overcomes the drawbacks associated with the prior art by the fact that the sealing ring of the present invention has a first annular portion turned towards the second rotor part, the first annular portion in unloaded condition having an outer radius, which at least is as large as the outer radius of a first annular portion of the groove, which is arranged to receive this first annular portion of the sealing ring, that the first annular portion of the sealing ring has a radial width, which at least is as large as the radial width of a section of the first annular portion of the groove located closest to the second rotor part, that the groove has a second annular portion turned away from the second rotor part, the second annular portion connecting to an axial end of the first annular portion of the groove and having an outer annular recess, which extends axially from this axial end radially outwardly from the outer radius of the first portion at this axial end, that the groove has a bottom located in the second annular portion of the groove at its end turned away from the second portion of the rotor, that the sealing ring has a second annular portion turned away from the second rotor part, the second annular portion connecting to an axial end of the first annular portion of the sealing ring and having at least one projection, which at least partly fills up the outer annular recess in the second annular portion of the groove and abuts at least against an inner surface of the recess located closest to this axial end, the axial end of the first annular portion of the sealing ring and the axial end of the first annular portion of the groove being located at substantially the same axial level, that the groove also has an inner annular recess, which extends axially from the bottom of the groove to said section and radially inwardly from the inner radius of the section at an end of the section turned away from the second rotor part, the sealing ring in mounted condition being located radially outside the inner annular recess, and that the inner annular recess is adapted, upon elastical deformation of at least one of the first rotor part, the first annular portion of the sealing ring and the second annular portion of the sealing ring, to enable the sealing ring to be turned in an inclined position in an axial crossection to an insertion and removal direction, the maximum dimension perpendicular to this insertion and removal direction of the sealing ring being less than the minimum dimension of the groove perpendicular to this insertion and removal direction.

Hereby, the retaining force is accomplished by means of locking by shape instead of by means of a clamping joint and the tightening force is transferred from the sealing ring to the first rotor part by pressing the sealing ring against the bottom of the groove, which causes much lower stress concentrations.

In a preferred embodiment the first and the second annular portion of the sealing ring are formed in one single integrated piece. The projection on the second annular portion of the sealing ring suitably extends substantially along the entire periphery of the sealing ring.

In another embodiment of the invention the radial width of said section decreases by distance from the second rotor part. Hereby, liquid and other pollutants can be prevented from leaking into the groove.

The rotor parts are rotatable around a rotational axis, the sealing ring extending concentrically around the rotational axis.

In a further embodiment of the invention the sealing ring is made of a polymer such as polyetheretherketone or polyoxymethylene.

BRIEF DESCRIPTION OF THE DRAWINGS

In the following the invention is described more closely with reference to the figures on the attached drawings in which FIG. 1 schematically shows an axial section through a part of a centrifugal separator, which is provided with one embodiment of a sealing ring according to the invention.

DETAILED DESCRIPTION OF THE PREFERRED EMBODIMENTS

Figure 1:
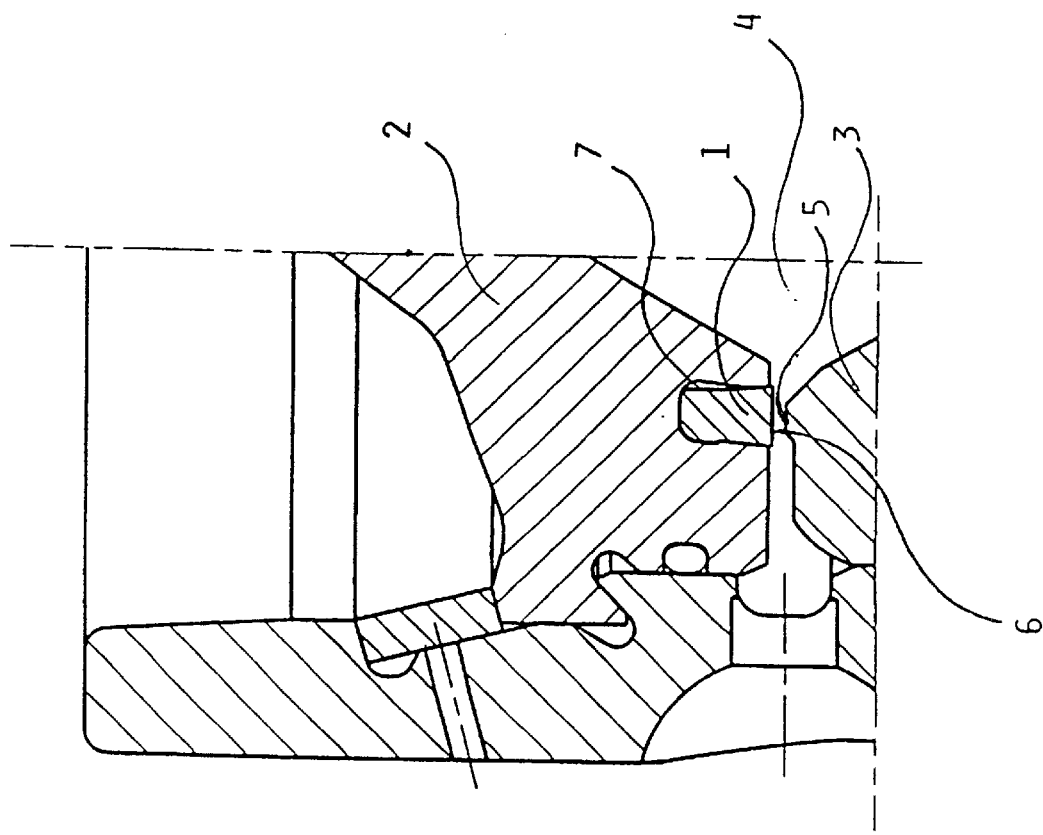

In FIG. 1 a part of a rotor of a centrifugal separator is shown, which is provided with a sealing ring 1 according to the present invention. The rotor, which is rotatable around a rotational axis, not shown, has a first rotor part 2 and a second rotor part 3. The two rotor parts 2 and 3 delimit together a separation chamber 4. The second rotor part is axially movable with an abutment surface 5 in and out of abutment against a sealing surface 6 of the sealing ring 1, which is inserted in an annular groove 7, which surrounds a rotational axis, not shown.

Figure 2:
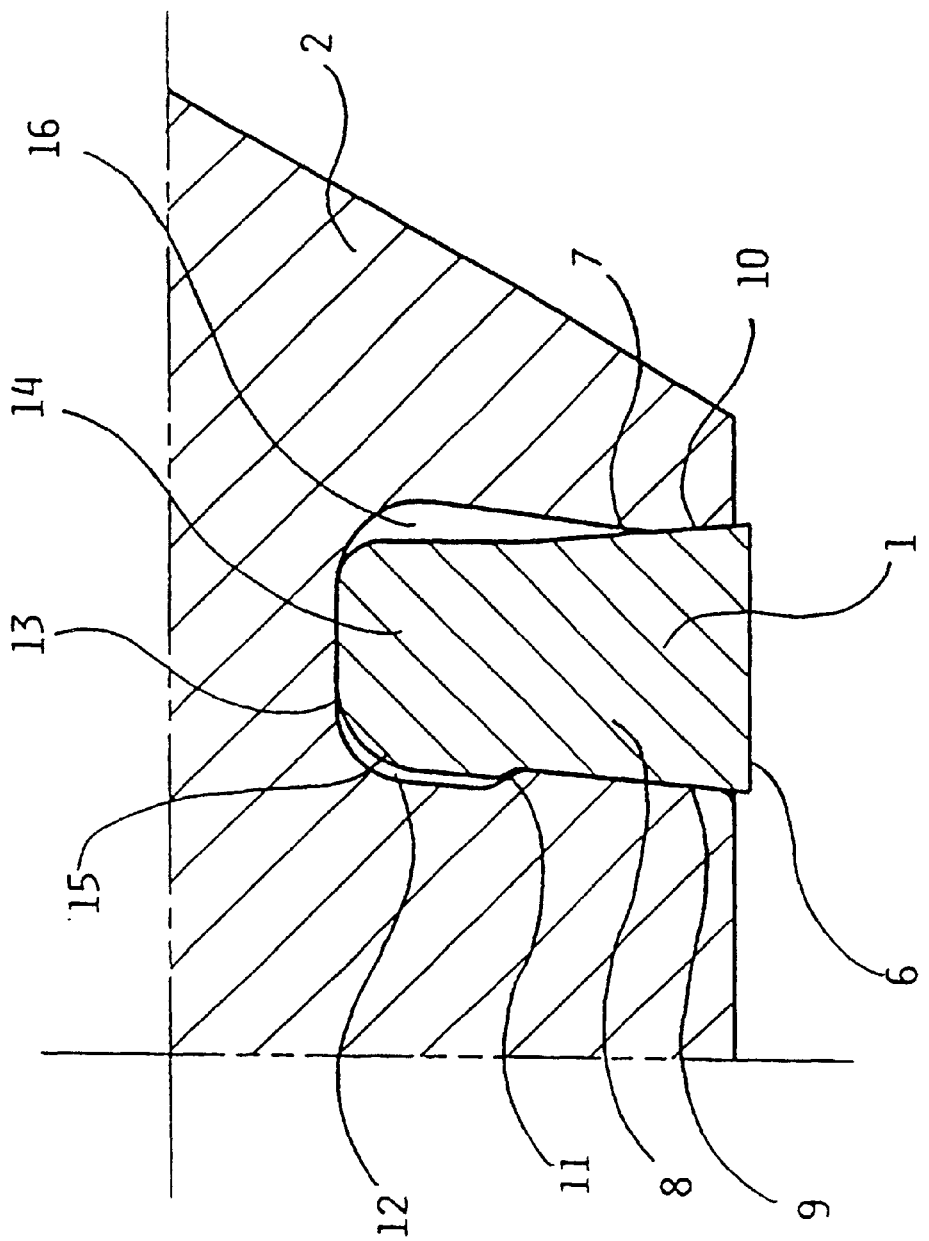
FIG. 2 shows the sealing ring in more detail.

The closer design of the sealing ring 1 and of the groove 7 according to the invention is apparent from FIG. 2.

The sealing ring 1 has a first sealing portion 8 turned towards the second rotor part 3, the first annular portion 8 having in unloaded condition an outer radius, which is at least as large as the outer radius of a first annular part 9 of the groove 7, which is arranged to receive this first annular portion 8 of the sealing ring 1.

The first annular portion 8 of the sealing ring has a radial width which is at least as large as the radial width of an axial section 10 of the first annular portion 9 of the groove 7 located closest to the second rotor part 3. The groove 7 has a second annular portion 11 turned away from the second rotor part 3 and a bottom 13 located in the second annular portion 11 of the groove 7 at the end of it turned away from the second rotor part 3. This second annular portion 11 connects to an axial end of the first annular portion 9 of the groove 7 and has an outer annular recess 12. The recess 12 extends axially from this axial end and radially outwardly from the outer radius of the first portion 9 at this axial end.

The sealing ring has a second annular portion 14 turned away from the second rotor part, the second annular portion 14 connecting to an axial end of the first annular portion 8 of the sealing ring and having a projection 15, which at least partly fills up the outer annular recess 12 in the second annular portion 11 of the groove 7 and abuts at least against an inner surface of the recess 12 located closest to this axial end. The axial end of the first annular portion 8 of the sealing ring 1 and the axial end of the first annular portion 9 of the groove 7 are located at substantially the same axial level. The groove 7 also has an inner annular recess 16, which extends axially from the bottom of the groove 7 to said section 10 and radially inwardly from the inner radius of the section 10 at the end of the section 10 turned away from the second rotor part 3, the inner annular recess 16 being empty.

The inner annular recess 16 is arranged upon elastical deformation of at least one of the first rotor part 2, the first annular portion 8 of the sealing ring and the second annular portion 14 of the sealing ring, to enable the sealing ring 1 to be put in an inclined position in an axial cross-section relative to the groove 7 to a direction of insertion and removal, the maximum dimension of the sealing ring 1 perpendicular to this insertion and removal direction being less than the minimum dimension of the groove 7 perpendicular to this insertion and removal direction.

Which one of the elements which is deformed or which is deformed mostly depends on their stiffnesses relative to one another. The decisive thing is that the turning of the sealing ring into an inclined position is made possible by the deformation so that the sealing ring can be brought in and out of the groove. If a sealing ring made of a stiff metallic material such as bronze is used instead, the first rotor part 2 is mainly deformed. If a sealing ring made of a polymer such as polyetheretherketone or polyoxymethylene is used instead the sealing ring 1 is mainly deformed by the second annular portion 14 of it being compressed.

In the shown example the sealing ring 1 is shaped in one single integrated piece, which extends around the rotational axis. Suitably, the projection extends along the entire periphery of the sealing ring.

What is claimed is:

1. A sealing ring for insertion into an axially open annular groove in a first rotor part of a centrifugal separator, the centrifugal separator having a second rotor part movable relative to the first rotor part, the second rotor part having an abutment surface intended to be brought in and out of sealing abutment against a sealing surface of a sealing ring mounted in the groove, the sealing ring being pressed axially in a direction into the groove, the sealing ring comprising:

a first annular portion adapted to be turned towards the second rotor part, the first annular portion in an unloaded condition having an outer radius, which is at least as large as an outer radius defined by a first annular portion of the groove, which is arranged to receive the first annular portion of the sealing ring;

the first annular portion of the sealing ring having a radial width, which is at least as large as the radial width of a section of the first annular portion of the groove located closest to the second rotor part;

the groove having a second annular portion turned away from the second rotor part, the second annular portion connecting to an axial end of the first annular portion of the groove and having an outer annular recess, which extends axially from axial end of the first annular portion of the groove radially outwardly from the outer radius of the first portion at the axial end, the groove having a bottom located in the second annular portion of the groove turned away from the second rotor part, sealing ring having a second annular portion turned away from the second rotor part, the second annular portion connecting to an axial end of the first annular portion of the sealing ring and having at least one projection, which at least partly fills up the outer annular recess in the second annular portion of the groove and abuts at least against an inner surface of the recess located closest to the axial end of the first annular portion when the sealing ring is mounted in the groove, the axial end of the first annular portion of the sealing ring and the axial end of the first annular portion of the groove being located at substantially the same axial level, the groove also has an inner annular recess, which extends axially from the bottom of the groove to an axial section spaced away from the bottom and radially inwardly from the inner radius of axial section at an end thereof turned away from the second rotor part, the sealing ring in mounted condition being located radially outside the inner annular recess, and wherein the inner annular recess is adapted upon elastic deformation of at least one of the first rotor part, the first annular portion of the sealing ring and the second annular portion of the sealing ring to enable the sealing ring to be turned in an inclined position in an axial cross-section to an insertion and removal direction, the maximum dimension perpendicular to this insertion and removal direction of the sealing ring being less than the minimum dimension of the groove perpendicular to this insertion and removal direction.

2. A sealing ring according to claim 1, wherein the first and the second annular portion of the sealing ring are formed in one single integrated piece.

3. A sealing ring according to claim 1, wherein said at least one projection on the second annular portion of the sealing ring extends substantially along the entire periphery of the sealing ring.

4. A sealing ring according to claim 1, wherein the radial width of the axial section of the groove decreases with distance from the second rotor part.

5. A sealing ring according claim 1 wherein the first and second rotor parts are each rotatable around a rotational axis, and the sealing ring extends around the rotational axis.

6. A sealing ring according claim 1 wherein the sealing ring is made of a polymer.

7. A sealing ring according to claim 6, wherein the sealing ring is made of polyetheretherketone.

8. A sealing ring according to claim 6, wherein the sealing ring is made of polyoxymethylene.

* * * * *